Patented Apr. 5, 1927.

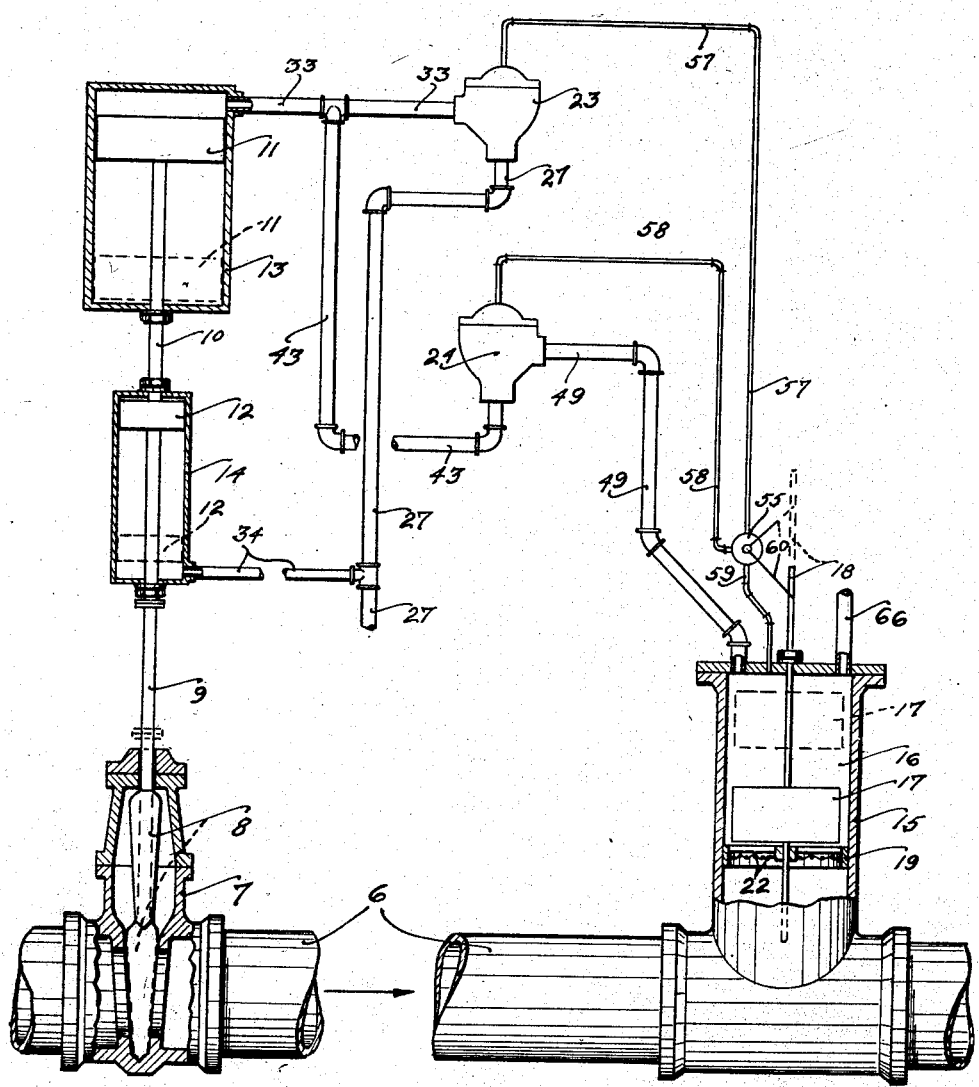

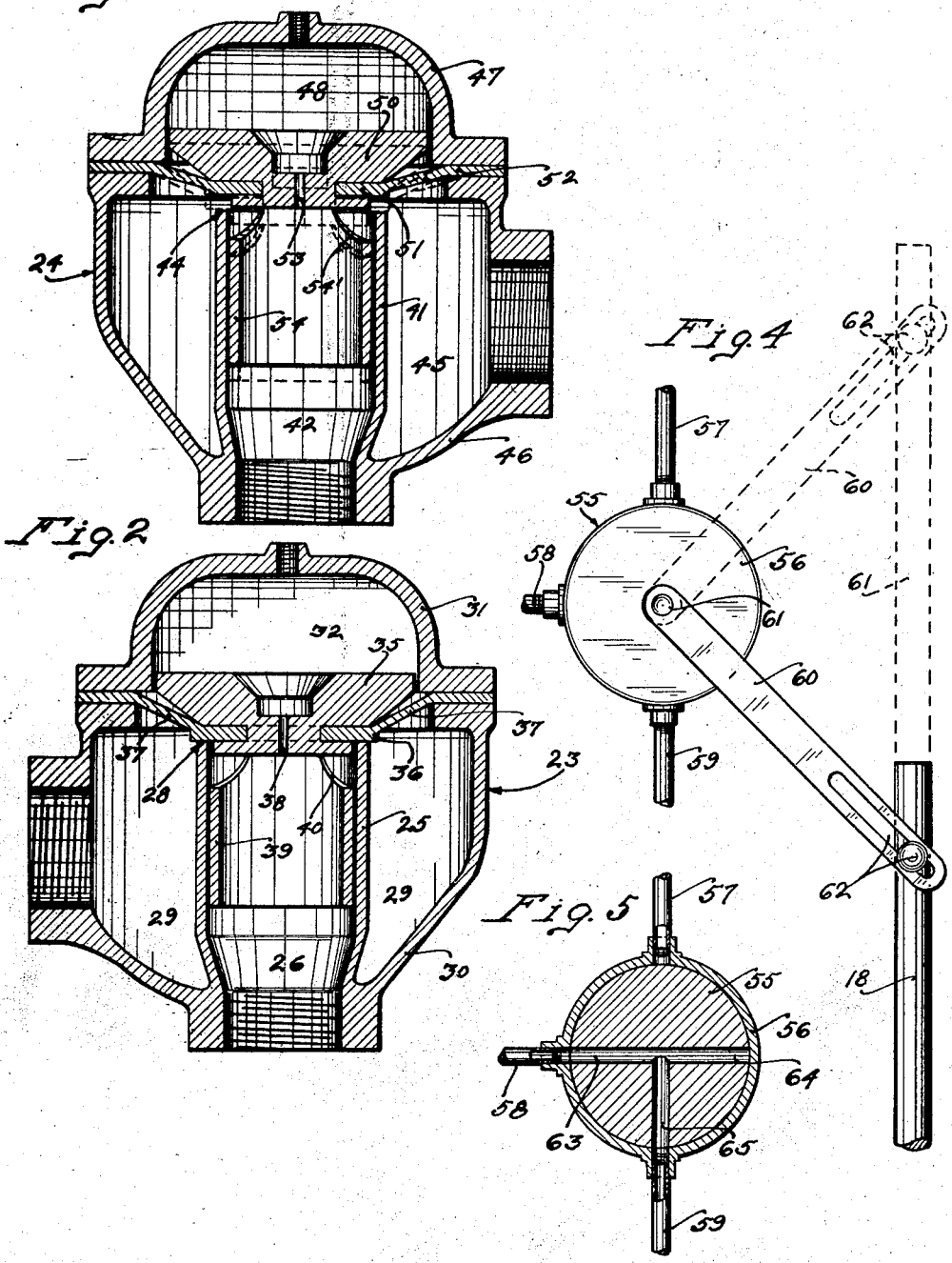

1,623,586

UNITED STATES PATENT OFFICE.

DONALD FORFAR, OF MINNEAPOLIS, MINNESOTA.

BACKWATER VALVE.

Application filed August 15, 1925. Serial No. 50,372.

My present invention relates to backwater valves especially adapted for installation in sewer connections to prevent an inflow of water due to storm conditions or otherwise and thereby prevent property damage.

Said invention has for its object to provide a mechanism for operating such a valve that is automatically set in motion by the backing up of water in the sewer connection to close the backwater valve, and again automatically set in motion by the receding of said water to open said valve. This mechanism when once set in motion to either open or close the backwater valve is operated by a motive power entirely independent of the flood water in the sewer connection.

Preferably, as illustrated, water under pressure is taken from city mains or any other available source of water supply under pressure and is used to hydraulically operate the backwater valve.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a fragmentary view of the invention partly in side elevation and partly in central vertical section;

Figs. 2 and 3 are views of motor valves principally in central vertical section;

Fig. 4 is an elevation of a three-way valve and connections for operating the same, some parts being shown in different positions by means of broken lines; and Fig. 5 is a view of the three-way valve in central vertical section.

The numeral 6 indicates a sewer pipe the normal direction of flow therein being indicated by the arrow on Fig. 1. Interposed in the sewer pipe 6 is a valve casing 7 in which is mounted a quick opening pattern gate valve 8 having an upright valve stem 9 working through a stuffing box on the top of said casing, and during normal conditions said valve is open. To the upper end of the valve stem 9 is secured an extension that affords a piston rod 10 having secured thereto upper and lower differential pistons 11 and 12, respectively, the former of which has a much greater area than the latter. These pistons 11 and 12 work in co-operating cylinders 13 and 14, respectively, and the piston rod 10 works through stuffing boxes on the lower head of the cylinder 13 and on both heads of the cylinder 14.

Interposed in the sewer pipe 6 outward of the valve casing 7, in respect to the discharge from said pipe, is a pipe fitting having an upstanding cylindrical casing 15 for a float chamber 16 in which is mounted a float 17 secured to the intermediate portion of a float stem 18. The lower portion of the float stem 18 is mounted in a spider 19 secured to the casing 15 below the float 17, and the upper end of said stem works through a stuffing box in the top of said casing. A sediment screen 22 is secured to the spider 19 and separates the float chamber proper from the sewer pipe 6.

The numerals 23 and 24 indicate motor valves identical the one with the other. The motor valve 23 includes a cylindrical upright casing 25 within which is a water supply chamber 26 connected at the bottom to a water supply pipe 27 leading from any suitable source of water supply under pressure, such as a city water supply system. The upper end of the casing 25 is open and affords a valve seat 28. Surrounding the casing 25 is a water discharge chamber 29, the casing 30 of which at its bottom is integrally formed with the lower end of the casing 25, and at its top is open and extends somewhat above the valve seat 28. A dome-like cover 31 for the casing 30 is bolted or otherwise detachably secured to the top thereof, and within which is a water pressure chamber 32. A water supply pipe 33 leads from the water discharge chamber 29 to the cylinder 13 at the top thereof. A relatively small branch water supply pipe 34 leads from the water supply pipe 27 to the cylinder 14 at the bottom thereof.

A differential valve 35 is mounted on the valve seat 28 for opening and closing the water supply chamber 26 to the water discharge chamber 29 and for closing said two chambers to the water pressure chamber 32. The small area of this differential valve 35 is in the water supply chamber 26 and the large area thereof is in the water pressure chamber 32. A pliable packing 36, secured in a peripheral groove in the differential valve 35, is arranged to rest on the valve seat 28 when said valve is closed to form a water-tight joint between the chambers 26 and 29. The differential valve 35 is carried by a diaphragm 37 formed as a part of the packing 36 and secured in position by having its outer marginal edge portion clamped between the top of the casing 30 and the cover 31. A constantly open axial port 38 extends completely through the differential valve 35 and connects the water supply chamber 26 to the water pressure chamber 32. Integrally formed with the small area of the differential valve 35 is a depending hollow stem 39 that extends loosely into the casing 25 for guiding said valve. Formed in the stem 39 at its upper end is a plurality of circumferentially spaced ports 40 for the passage of water through said hollow stem from the water supply chamber 26 to the water discharge chamber 29 when the differential valve 35 is open. During normal conditions, the differential valve 35 is closed, as shown in Fig. 2.

As previously stated, the motor valve 24 is identical with the motor valve 23 and includes a cylindrical upright casing 41 within which is a water supply chamber 42, and a water supply pipe 43 for said chamber leads from the water supply pipe 33 to the bottom of said chamber. The upper end of the casing 41 affords a valve seat 44. Surrounding the casing 41 is a water discharge chamber 45, the casing 46 of which, at its bottom, is integrally formed with the lower end of the casing 41 and at its top is open and extends somewhat above the valve seat 44. A dome-like cover 47 for the casing 46 is bolted or otherwise detachably secured to the top thereof and within said cover is a water pressure chamber 48. A waste water pipe 49 leads from the water discharge chamber 45 to the float chamber 16 at the top thereof.

A differential valve 50 is mounted on the valve seat 44 for opening and closing the water supply chamber 42 to the water discharge chamber 45 and for closing said two chambers to the water pressure chamber 48. The small area of the differential valve 50 is in the water supply chamber 42 and the large area thereof is in the water pressure chamber 48. A pliable packing 51, secured in a peripheral groove in the differential valve 50, is arranged to rest on the valve seat 44 when said valve is closed to form a water-tight joint between the chambers 42 and 45. The differential valve 50 is carried by a diaphragm 52 formed as a part of the packing 51 and secured in position by having its outer marginal edge portion clamped between the top of the casing 46 and the cover 47. A constantly open axial port 53 extends completely through the differential valve 50 and connects the water supply chamber 42 to the water pressure chamber 48. Integrally formed with the small area of the differential valve 50 is a depending hollow stem 54 that extends loosely into the casing 41 for guiding said valve. Formed in the stem 54 at its upper end is a plurality of circumferentially spaced ports 54' for the passage of water through said hollow stem from the water supply chamber 42 to the water discharge chamber 45 when the differential valve 50 is open. Under normal conditions the differential valve 50 is open, as shown in Fig. 3.

For automatically controlling the motor valves 23 and 24 I provide a three-way rotary valve 55 mounted in a cylindrical casing 56. Small water pipes 57 and 58 lead from the water pressure chambers 32 and 48, respectively, to the three-way valve 55. A small waste water pipe 59 leads from the three-way valve 55 to the float chamber 16 at the top thereof. These water pipes 57 and 58 and the waste pipe 59 open into the valve casing 56 at circumferentially spaced points, forty-five degrees apart. A radial arm 60 is secured to the shaft 61 of the three-way valve 55 for operating the same, and which arm is connected to the upper end of the float stem 18 by a slot and pin connection 62. The three-way valve 55 has three radial ports 63, 64 and 65, which communicate the one with the other, and during normal conditions said valve closes the water pipe 57 and connects the water pipe 58 to the waste water pipe 59 through the ports 63 and 65.

Under normal conditions, the float 17 is in its low position and holds the three-way valve 55 in a position to close the water pipe 57 and connect the water pipe 58 to the waste water pipe 59 through the ports 63 and 65, as shown in Fig. 5. As previously stated, the water pipe 57 is closed by the three-way valve 55 and a water pressure has been built up in the water pressure chamber 32 through the port 38 from the water supply pipe 27, and which built-up pressure, acting on the large area of the differential valve 35, holds the same closed and, hence, cuts off the water supply to the large piston 11 through the water pipe 33. With the water supply pipe 27 closed at the motor valve 23, the water pressure in the cylinder 14, which is connected by the pipe 34 to the water supply pipe 27, holds the piston 12 raised which in turn holds the gate valve 8 open, as indicated in Fig. 1, to permit a free flow through the sewer pipe 6 in the direction of the arrow on said figure. When the gate valve 8 is open, the piston 11 is in its high position and the cylinder 13 is open for drainage to the sewer pipe 6 through the pipes 33 and 43, motor valve 24, pipe 49 and float chamber 16.

As the water supply pipe 27 is closed by the motor valve 23, the water supply to the motor valve 24 is cut off and, hence, the same is open, as shown in Fig. 3. The water pressure chamber 48 in the motor valve 24 is also open to the sewer pipe 6 through the pipe 58, three-way valve 55, waste water pipe 59 and float chamber 16.

In case flood water, due to storms or otherwise, backs up in the sewer pipe 6, the float 17 will be moved thereby into its high position, as indicated by broken lines in Fig. 1, thereby automatically operating the three-way valve 55 to close the water pipe 58 and connect the water pipe 57 to the waste pipe 59 through the ports 63 and 64. By connecting the water pipe 57 to the waste pipe 59 through the three-way valve 55, the built-up water pressure in the pressure chamber 32 will be released and the water pressure in the pipe 27, acting on the small area of the differential valve 35, will open said valve and cause a flow from the water supply chamber 26 into the water discharge chamber 29 and from thence into the cylinder 13 through the pipe 33. During this same time, water entering the pipe 43 from the water supply pipe 27 through the open motor valve 24 and water pipe 33 will fill the water supply chamber 42 and start building up a water pressure in the water pressure chamber 48 through the port 53, due to the fact that the water pipe 58 is closed by the three-way valve 55. When sufficient water pressure is built up in the pressure chamber 48 on the large area of the differential valve 50 to overcome the water pressure on the small area thereof, said valve will be closed against the water pressure from the water supply pipe 27. At the time the differential valve 50 is closed, the pressure of water released to the cylinder 13 from the water supply pipe 27 by the opening of the motor valve 23 will move the large piston 11 down by overcoming the water pressure in the cylinder 14 on the small piston 12 and operate the gate valve 8 and close the sewer pipe 6, as indicated by broken lines in Fig. 1, to stop further inflow of flood water and hold said gate valve closed as long as the flood water holds the float 17 raised.

When the flood water in the sewer pipe 6 has receded, the float 17 will return to normal position, thereby automatically operating the three-way valve to close the water pipe 57 to the waste water pipe 59 and open the water pipe 58 to said waste pipe. With the closing of the pipe 57 to the waste pipe 59 and the opening of the pipe 58 thereto by the three-way valve 55, water pressure will start to build up in the water pressure chamber 32 through the port 38 and again close the differential valve 35 and, hence, close the water supply from the pipe 27 to the cylinder 13. At the same time, the water pressure in the motor valve 24 will be released through the pipe 58, ports 63 and 65 to the float chamber 16 and the water in the water discharge chamber 45 will waste through the pipe 49 to said float chamber and thereby allow the differential valve 50 to open. By the closing of the motor valve 23, the water supply to the cylinder 13 is cut off and the opening of the motor valve 24 permits said cylinder to be drained to the float chamber 16 through the pipes 33 and 43, motor valve 24 and pipe 49 during the raising of the large piston 11 under the action of the water pressure on the small piston 12. By the raising of the small piston 12 the gate valve 8 is lifted and thereby opens the sewer pipe 6 for normal conditions. Leading from the top of the float chamber 16 is a vent pipe 66.

What I claim is:

1. In a pipe line, the combination with a normally open gate valve for closing the pipe line, of a main water pipe leading from a source of supply under pressure, main and supplemental differential cylinders and pistons for opening and closing the gate valve, said main piston having a much larger area than the supplemental piston, said two cylinders being connected to the main water pipe, the water pressure in the supplemental cylinder being constant and normally holding the supplemental piston with the gate valve open, said main cylinder having a waste pipe, valves adapted to be closed by the water pressure in the main water pipe and normally closing the water supply to the main cylinder and opening the waste pipe therefrom, and automatic means for alternately releasing the water pressure in said valves to permit the same to open.

2. The structure defined in claim 1 in which said automatic means includes a three-way valve.

3. In a pipe line, the combination with a normally open gate valve for closing said pipe line, of a main water pipe leading from a source of supply under pressure, main and supplemental differential pistons and cylinders for opening and closing the gate valve, said main piston having a much larger area than the supplemental piston, main and supplemental motor valves interposed in the main water pipe, the latter in advance of the former, the supplemental cylinder being connected to the main water pipe in advance of the main motor valve, said main cylinder being connected to the main water pipe between the two motor valves, said main motor valve normally closing the main water pipe to the supplemental motor valve and the main cylinder, said main water pipe being connected to the two cylinders on opposite ends of their pistons, the water pressure in the supplemental cylinder normally holding the supplemental piston with the gate valve open, and automatic means for alternately opening and closing the motor valves.

4. The structure defined in claim 3 in further combination with a drain pipe leading from the supplemental motor valve for draining the main cylinder during the opening of the gate valve.

5. The structure defined in claim 3 in which said automatic means includes a three-way valve.

6. In a pipe line, the combination with a normally open gate valve for closing said pipe line, of a main water pipe leading from a source of supply under pressure, main and supplemental differential pistons and cylinders for opening and closing the gate valve, said main piston having a much larger area than the supplemental piston, main and supplemental motor valves interposed in the main water pipe, the latter in advance of the former, the supplemental cylinder being connected to the main water pipe in advance of the main motor valve, said main cylinder being connected to the main water pipe between the two motor valves, said main motor valve normally closing the main water pipe to the supplemental motor valve and the main cylinder, said main water pipe being connected to the two cylinders on opposite ends of their pistons, the water pressure in the supplemental cylinder normally holding the supplemental piston with the gate valve open, each of said motor valves having a differential valve and a pressure chamber in which water pressure may be built up from the main water pipe to close said valve, a three-way valve having a drain pipe, a pipe connection from the pressure chamber of each motor valve to the three-way valve, and automatic means for operating the three-way valve to alternately open and close the pipes from the pressure chambers to the waste pipe of the three-way valve.

7. In a pipe line, the combination with a normally open gate valve for closing said pipe line, of a main water pipe leading from a source of supply under pressure, main and supplemental differential pistons and cylinders for opening and closing the gate valve, said main piston having a much larger area than the supplemental piston, main and supplemental motor valves interposed in the main water pipe, the latter in advance of the former, the supplemental cylinder being connected to the main water pipe in advance of the main motor valve, said main cylinder being connected to the main water pipe between the two motor valves, said main motor valve normally closing the main water pipe to the supplemental motor valve and the main cylinder, said main water pipe being connected to the two cylinders on opposite ends of their pistons, the water pressure in the supplemental cylinder normally holding the supplemental piston with the gate valve open, each of said motor valves having a differential valve and a pressure chamber in which water pressure may be built up from the main water pipe to close said valve, a three-way valve having a drain pipe, a pipe connection from the pressure chamber of each motor valve to the three-way valve, and automatic means in the pipe line adapted to be actuated by liquid in the pipe line for operating the three-way valve to alternately open and close the pipes from the pressure chambers to the waste pipe of the three-way valve.

8. In a pipe line, the combination with a normally open gate valve for closing said pipe line, of a main water pipe leading from a source of supply under pressure; main and supplemental differential pistons and cylinders for opening and closing the gate valve, said main piston having a much larger area than the supplemental piston, main and supplemental motor valves interposed in the main water pipe, the latter in advance of the former, the supplemental cylinder being connected to the main water pipe in advance of the main motor valve, said main cylinder being connected to the main water pipe between the two motor valves, said main motor valve normally closing the main water pipe to the supplemental motor valve and the main cylinder, said main water pipe being connected to the two cylinders on opposite ends of their pistons, the water pressure in the supplemental cylinder normally holding the supplemental piston with the gate valve open, each of said motor valves having a differential valve and a pressure chamber in which water pressure may be built up from the main water pipe to close said valve, a three-way valve having a drain pipe, a pipe connection from the pressure chamber of each motor valve to the three-way valve, and a float in the pipe line for operating the three-way valve to alternately open and close the pipes from the pressure chambers to the waste pipe of the three-way valve.

9. In a pipe line, the combination with a normally open gate valve for closing said pipe line, of a main water pipe leading from a source of supply under pressure, main and supplemental differential pistons and cylinders for opening and closing the gate valve, said main piston having a much larger area than the supplemental piston, main and supplemental motor valves interposed in the main water pipe, the latter in advance of the former, the supplemental cylinder being connected to the main water pipe in advance of the main motor valve, said main cylinder being connected to the main water pipe between the two motor valves, said main motor valve normally closing the main water pipe to the supplemental motor valve and the main cylinder, said main water pipe being connected to the two cylinders on opposite ends of their pistons, the water pressure in the supplemental cylinder normally holding the supplemental piston with the gate valve open, each of said motor valves having a differential valve and a pressure chamber in which water pressure may be bulit up from the main water pipe to close said valve, a three-way valve having a drain pipe, a pipe connection from the pressure chamber of each motor valve to the three-way valve, a float chamber in the pipe line, and a float in the float chamber for operating the three-way valve to alternately open and close the pipes from the pressure chambers to the waste pipe of the three-way valve.

10. The structure defined in claim 9 in which the waste pipes from the supplemental motor valve and the three-way valve are arranged to discharge into the float chamber.

11. The structure defined in claim 3 in which each of the motor valves has a differential valve embodied in a diaphragm, a pressure chamber with a constantly open port and in which water pressure from the main water pipe may be built up to close said valve, and automatic means including a valve for alternately opening and closing said pressure chambers.

12. The structure defined in claim 9 in further combination with a vent pipe leading from the float chamber.

In testimony whereof I affix my signature.

DONALD FORFAR.